US012693647B2

(12) United States Patent
Howe

(10) Patent No.: US 12,693,647 B2
(45) Date of Patent: Jul. 28, 2026

(54) AUTOMATED STATUS INDICATING MONITORING AND CONTROL NODE

(71) Applicant: Howe Neat, Inc., Benicia, CA (US)

(72) Inventor: Daniel Howe, Benicia, CA (US)

(73) Assignee: Howe Neat, Inc., Redding, CA (US)

( * ) Notice: Subject to any disclaimer, the term of this patent is extended or adjusted under 35 U.S.C. 154(b) by 444 days.

(21) Appl. No.: 17/900,647

(22) Filed: Aug. 31, 2022

(65) Prior Publication Data

US 2023/0062795 A1 Mar. 2, 2023

Related U.S. Application Data

(60) Provisional application No. 63/239,110, filed on Aug. 31, 2021.

(51) Int. Cl.
*G05B 19/05* (2006.01)

(52) U.S. Cl.
CPC .. *G05B 19/054* (2013.01); *G05B 2219/15117* (2013.01); *G05B 2219/24102* (2013.01)

(58) Field of Classification Search
CPC ............... G05B 19/042; G05B 19/054; G05B 2219/15117; G05B 2219/24102
See application file for complete search history.

(56) References Cited

U.S. PATENT DOCUMENTS

| | | | |
|---|---|---|---|
| 5,048,755 A * | 9/1991 | Dodds | G05B 19/042 |
| | | | 239/69 |
| 6,084,373 A | 7/2000 | Goldenberg et al. | |
| 8,326,440 B2 | 12/2012 | Christfort | |
| 8,526,810 B2 | 9/2013 | Cole et al. | |
| 9,858,771 B2 | 1/2018 | Kelly et al. | |
| 9,977,469 B2 | 5/2018 | Christfort | |
| 11,570,060 B2 | 1/2023 | Xue et al. | |
| 2005/0151660 A1* | 7/2005 | Mou | G08B 5/22 |
| | | | 340/531 |
| 2009/0216345 A1 | 8/2009 | Christfort | |
| 2012/0215366 A1* | 8/2012 | Redmond | G05B 19/042 |
| | | | 700/284 |
| 2016/0259376 A1 | 9/2016 | Christfort | |
| 2017/0207639 A1 | 7/2017 | Christfort | |
| 2020/0073346 A1* | 3/2020 | Chan | G05B 19/042 |
| 2020/0107422 A1* | 4/2020 | McReynolds | F21V 23/003 |
| 2022/0291651 A1* | 9/2022 | Gaus | H04L 45/123 |

FOREIGN PATENT DOCUMENTS

KR 101645089 B1 8/2016

OTHER PUBLICATIONS

U.S. Appl. No. 29/805,985, filed Aug. 31, 2021, Daniel Howe.

* cited by examiner

*Primary Examiner* — Tameem D Siddiquee
(74) *Attorney, Agent, or Firm* — Batt IP A Law Corporation; Richard Batt

(57) ABSTRACT

An automated monitoring status indicating node includes a body, a status indicator assembly, a memory and processor operable to activate the status indicator based on the status of a device being monitored. Related methods are disclosed.

13 Claims, 7 Drawing Sheets

200

230

222

240

220

250

210

242

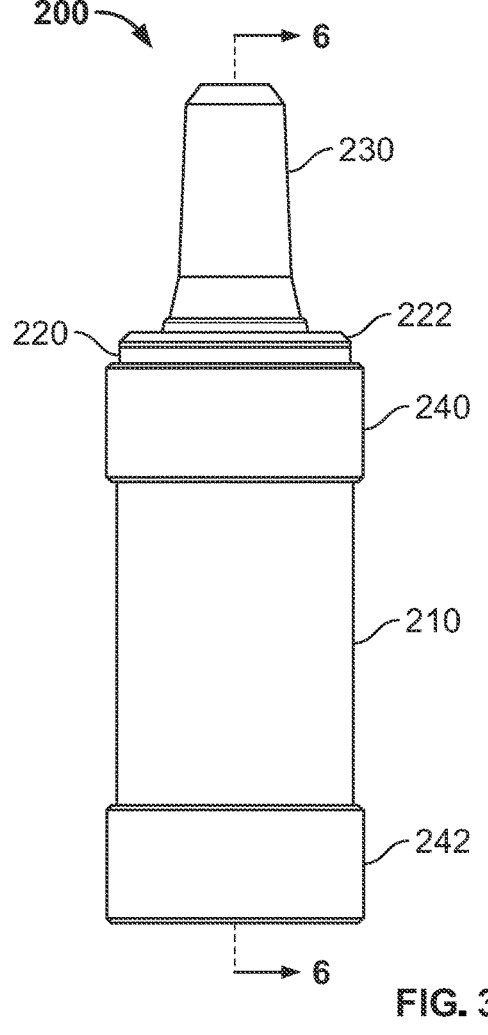
FIG. 3
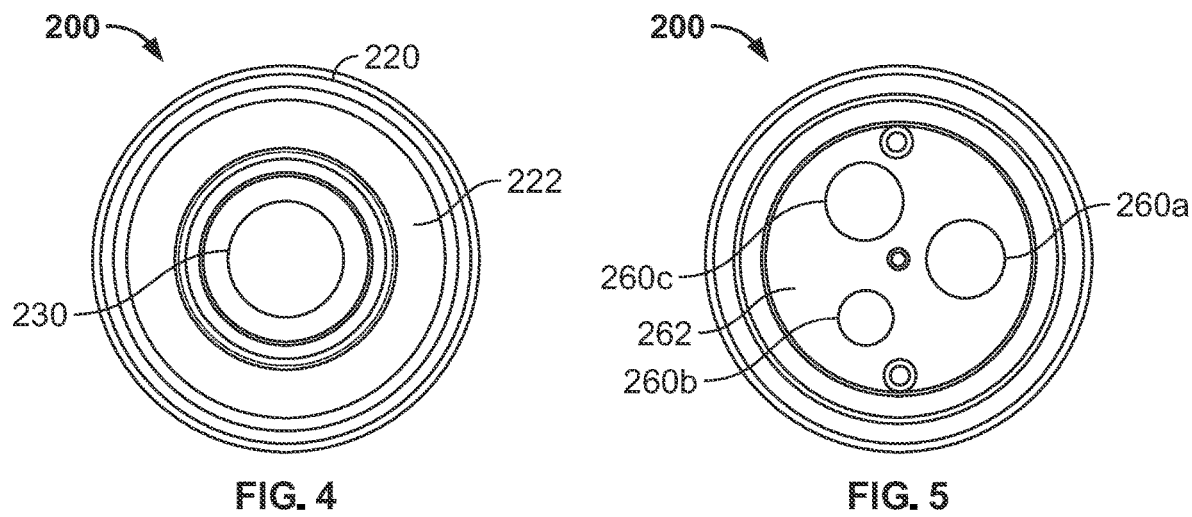
FIG. 4
FIG. 5

AUTOMATED STATUS INDICATING MONITORING AND CONTROL NODE

CROSS-REFERENCE TO RELATED APPLICATIONS

This application claims priority to provisional application No. 63/239,110, filed Aug. 31, 2021, and entitled "Automated status indicating monitoring and control node".

BACKGROUND

1. Field of the Invention

The invention relates to nodes for monitoring the status of devices, and more particularly, to nodes for automatically indicating the status of devices being monitored.

2. Description of the Related Art

In various industrial applications, remotely-operated nodes are installed to monitor and/or control another device such as a motor, remote operated valve, or a stand-alone sensor input. Such nodes, however, pose an operational risk for industrial operators due to the complexity of remote management interacting with onsite personnel. The risk to onsite personnel includes remote start/stop of a pump while a user is nearby, or additionally the motor of a pump could be in an error state and require attention to reduce damage to property.

Presently, operators manually operate the devices and when an error exists, operators must visually inspect sensor indicators such as pressure gauges. This requires the operator to be very close, namely, within arm's reach, of the device. This is undesirable.

Various patents discuss communicating information with an operator. For example, a computer node is described in U.S. Pat. No. 9,977,469 to Christfort, entitled "Modular computing node" for communicating with an operator. However, the '469 patent presents information to the operator using an LCD on the node itself which is difficult to read in a wide range of situations (such as e.g., when an operator is driving a tractor at a distance from the node). The LCD is small. This is undesirable.

Various software monitoring methods provide remote monitoring (whether on a mobile or desktop computer). However, in industrial settings such as at an agriculture pump site, a highly conspicuous onsite monitoring indicator is desired for safety and operation purposes—and one that does not require the operator to be immediately adjacent the device.

Thus, there is still a need for visually and conspicuously presenting the status of a node and its attached inputs and outputs to an end user. There is also a need to need for visually presenting the status of the node device and its attached inputs and outputs to an end user onsite, and without requiring the operator to read a display of any sort.

SUMMARY

In embodiments of the invention, an automated monitoring node includes processor and memory, an antenna, a wireless communication module, and a status indicator. In embodiments, the status indicator is programmatically operable to provide different light patterns, intensity, and color based on various sensed data.

In embodiments, the wireless communication node is multi-functional and operable to communicate using different types of wireless platforms such as, for example, Wi-Fi, Bluetooth, Cellular, Satellite, and/or RF. In embodiments, sensor data may be communicated via any of the aforementioned wireless communication methods to either a cloud based application server, or an on-premise server, or to any node connected to the same network and or server.

In embodiments, the node is operable to present a conspicuous visible status to users, and to be programmatically controlled, in-field using a configuration interface through mobile phone, or computer, or remotely using the cloud connected application. Users can choose any logical combinations such as error states, sensor values, time, or synchronization state to change light intensity, color and motion of the light status indicator.

In embodiments, the node is configured via the configuration methods described herein, whereby the logic is programmatically derived for the status indicator. Many logic combinations can be used and corresponding light color, intensity and motion can be controlled as a method of visual indication.

In embodiments, when the node is powered up, it checks internal storage of the device, for pre-programmed status indication logic to retrieve the instructions/arrays of stored logic. In a preferred embodiment, for example, an array 1 contains the logic whereby if a sensor is below the value threshold, the light color will be red, bright intensity, flashing in a circular pattern rotating about the body of the node.

In embodiments, when the node has completed normal setup and is operating, the status of the inputs and outputs are periodically compared against the array to determine if any condition matches. If a condition is matched, the corresponding action will be activated, and a message generated to display the corresponding message in a cloud connected application.

In embodiments, a method includes remotely updating the node status indication logic.

In embodiments, a cloud connection can serve to remotely monitor and control the device. However, the node is also adapted to be operable as a stand-alone device and independent of a cloud connection, WAN, LAN, or a mesh network.

In embodiments, the node is operable to allow a user to re-program the operation of the status indicator using either a directly connected computer using the programming port, remote wireless interface, or the cloud connected application from a mobile device or desktop application. A user can update the logic using either a command line terminal, or web page.

In embodiments, the node is operable to be used without the provided enclosure, where it is a standalone method for visual indication, such as when installed inside another client-provided or custom enclosure.

In embodiments, the node is operable to provide feedback specifically to the status of a sensor, or a combination of sensors and their corresponding values. Such that the irrigation status may be sensed through irrigation flow, and pump status, for example. Additionally, other sensors such as temperature and humidity could be used to alert a user of impending frost which could damage a crop, and in some remote locations, a user interface such as a cell phone is impractical for checking the status, the subject node provides the visual alert immediately in the field.

In embodiments, an automated monitoring status indicator node includes the components and features as described herein.

An automated monitoring status indicator assembly includes the components and features as described herein.

A method for indicating status of a monitored device includes the steps as described cloud-based herein.

A computer readable set of instructions, stored on a non-transient storage, for indicating status of a monitored device is operable to perform the steps as described herein.

The description, objects and advantages of the present invention will become apparent from the detailed description to follow, together with the accompanying drawings.

BRIEF DESCRIPTION OF THE DRAWINGS

FIGS. 2-5 are perspective, side, top and bottom views, respectively, of a node in accordance with an embodiment of the invention.

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail). U.S. Pat. No. 9,977,469, filed Mar. 2, 2016, and entitled "Modular computing node" is incorporated herein by reference in its entirety for all purposes.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

Overview Monitoring Node Network

Figure 1:
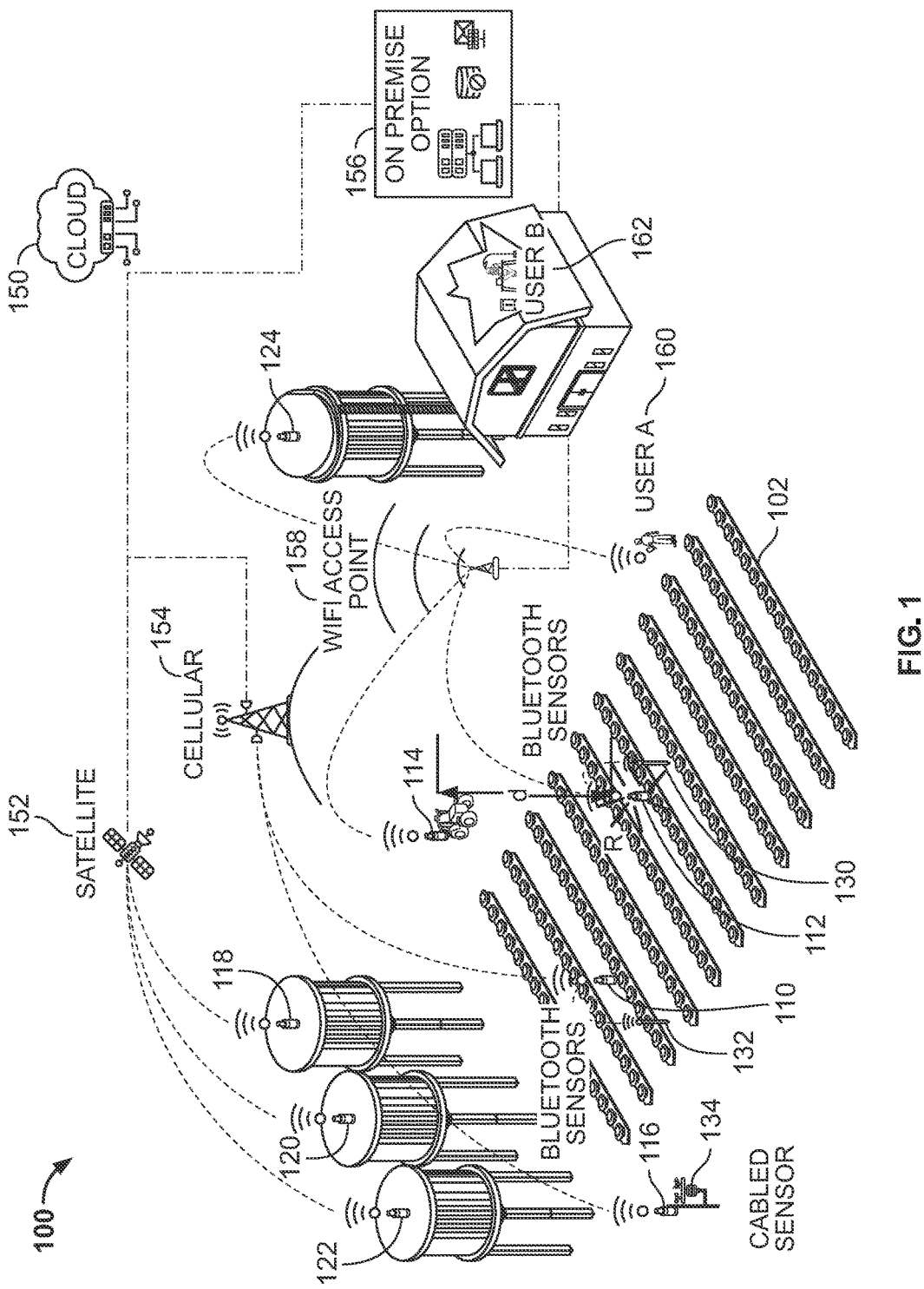
FIG. 1 depicts a network including a plurality of nodes in accordance with an embodiment of the invention.
Figure 2:
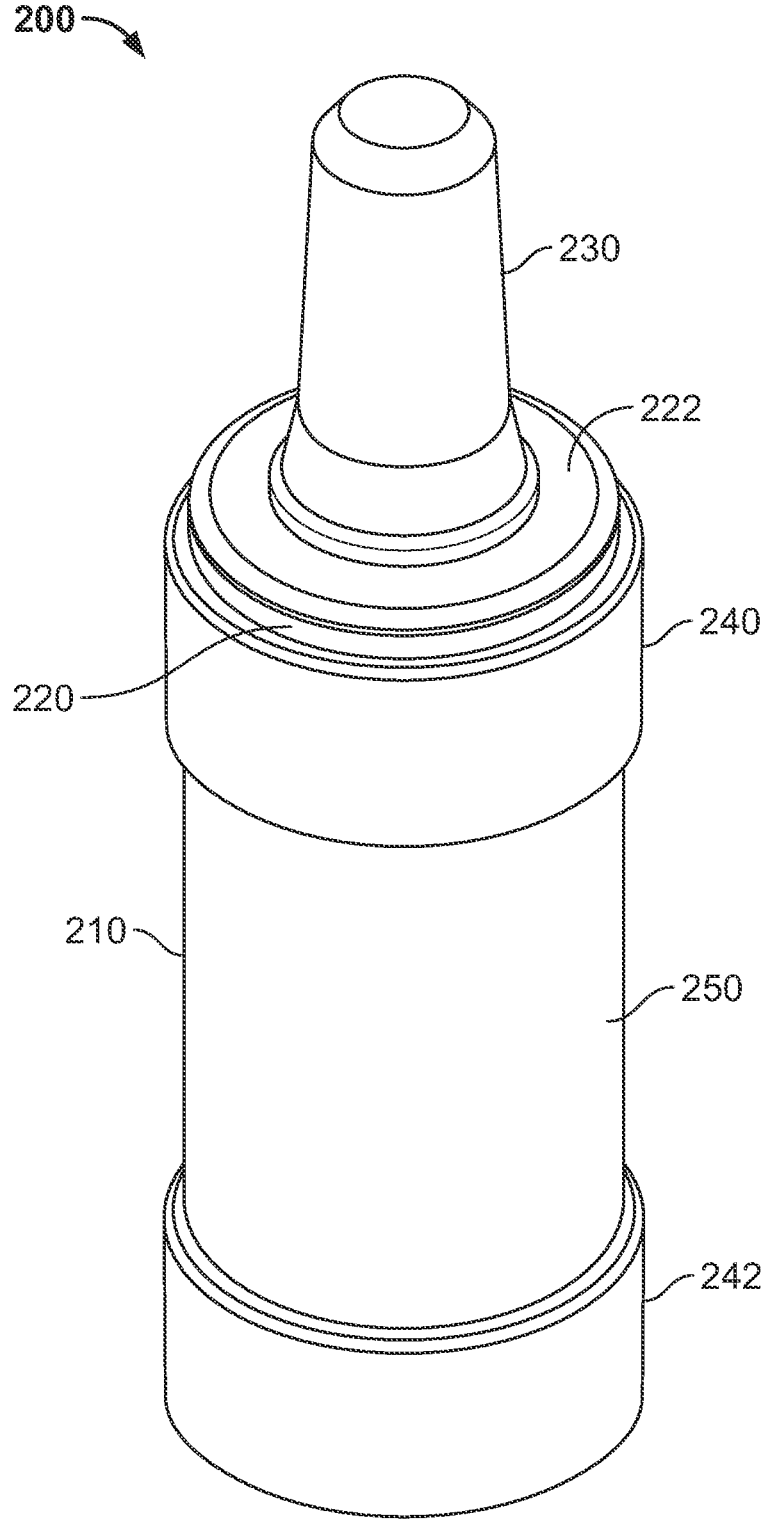

FIG. 1 depicts an example of an automated monitoring node (AMN) network 100 in accordance with an embodiment of the invention. In the example shown in FIG. 1, the AMN network 100 is directed to agricultural and includes a plurality of nodes 110, 112, 114, 116, 118, 120, 122, and 124. Though 8 nodes are shown in FIG. 1, it is to be understood that the number of nodes may vary. In embodiments, a network may comprise solely one node. More often, however, a plurality of nodes may be arranged in a setting. Exemplary number of nodes range from 5-25, and more often 5-10. However, the number may be adjusted based on the size of the areas and number of equipment being monitored.

Nodes 110, 112 are shown associated with Bluetooth-compatible sensors 130, 132 for detecting soil moisture.

Node 114 is shown arranged on a tractor. The node 114 is operable to receive sensor data from the tractor. The data may include, without limitation, speed, fuel, GPS location, etc.

Node 116 is shown hard wired or cabled to a weather station with temperature, humidity, wind speed and direction 134. Both the sensor 134 and node 116 are mounted on a stake, off the ground.

A plurality of nodes 118, 120, 122, 124 are shown mounted to the top of water towers. Each of these nodes can be in communication with a water level sensor for detecting water level.

Additionally, the automated monitoring nodes can be employed with a wide range of types of devices such as, for example, a controller that operates a water valve, a sensor that measures water level or humidity, a sensor that detects soil moisture levels, or at a flow meter connected to an irrigation pipe.

In embodiments, the nodes are coupled to a remote server or cloud-based server system 150, discussed further herein. As shown in FIG. 1, a variety of communication technologies are available to link the nodes to the cloud including without limitation satellite 152, cellular 154, and on-premise internet 156. In the network shown in FIG. 1, the water tower nodes 118, 120, 122 are shown communicating via satellite 152 to cloud 150. Nodes 110, 116 are shown communicating with cloud via cellular tower 154. Nodes 112, 114, and 124 are shown associated with the local Wi-Fi access point 158 to the on-premises internet 156. Examples of on-premises options include an ethernet cable network.

Additionally, and although not specifically illustrated in FIG. 1, the various nodes may communicate with one another via a mesh network. However, in some embodiments, a node can communicate indirectly with an adjacent node via a cloud 150 and/or Wi-Fi access point 158.

FIG. 1 also shows users 160, 162 accessing the nodes via a client device, such as a desktop computer, a smartphone, a tablet computer, etc. As discussed further herein, the users can utilize an App on a portable computing device or web-based application hosted on a remote server to communicate with the nodes.

In the embodiment shown in FIG. 1, node 112 is illuminated (R) to alert operators of the status of the device 130 being monitored. Consequently, in embodiments, the tractor operator is able to immediately observe the status of sensor 130 via an illuminated status indicator (R) on the node 112. In embodiments, the light pattern, intensity, and color of the light is programmed according to a condition of the sensor, described herein. Advantageously, the operator can obtain information about the status of sensors, valves, and other devices being monitored by the nodes from a distance (d) well beyond arms reach of the node, and without having to read a display of a portable computing device. As described herein, the subject node illumination is a great advantage over reading a small display on the node itself or having to read a message on a portable computing device.

Automated Monitoring Node (AMN)

FIGS. 2-5 show a perspective, side, and top view, respectively, of an automated monitoring node 200 in accordance with an embodiment of the invention. The node 200 is shown including a tubular enclosure 210, status indicator 220, plate 222, antenna 230 and sleeves 240, 242. As discussed herein, the node is operable to be programmed to activate the light in a wide variety of patterns, colors, and intensities. As discussed herein, the enclosure 210 holds several components such as, for example, a wireless receiver such as a wife and Bluetooth receiver 250.

Sleeves

The node is also shown with external sleeves 222, 242, which serve to cover joints as well as provide some degree of shock/motion absorption to protect the internal components from weather or moisture. In embodiments, the sleeves 222, 242 are rubber or a polymer or another material having elasticity, vibration resistant, anti-rust and moisture resistant qualities.

With reference to FIG. 5, a bottom view of the node 200 is shown including base 262 defining a plurality of apertures 260a, b, c which may be used for a wide range of connectors or cabling such as, for example, sensors, controllers, power supply, bus, and WAN/ethernet connection.

The node is preferably mounted or affixed to a stake, pole, fence, or another structure whether existing or added for supporting the computer node. A wide range of hardware may be used to affix the computer node to the structure. Examples of fastening hardware include without limitation screws, steel ribbon, mounting brackets, zip ties. Optionally, the node may be inset within the hollow or cavity of a stake or pole member. Indeed, a wide range of techniques may be employed to mount the node. Preferably, the node is elevated so as to achieve better wireless reception.

Figure 6:
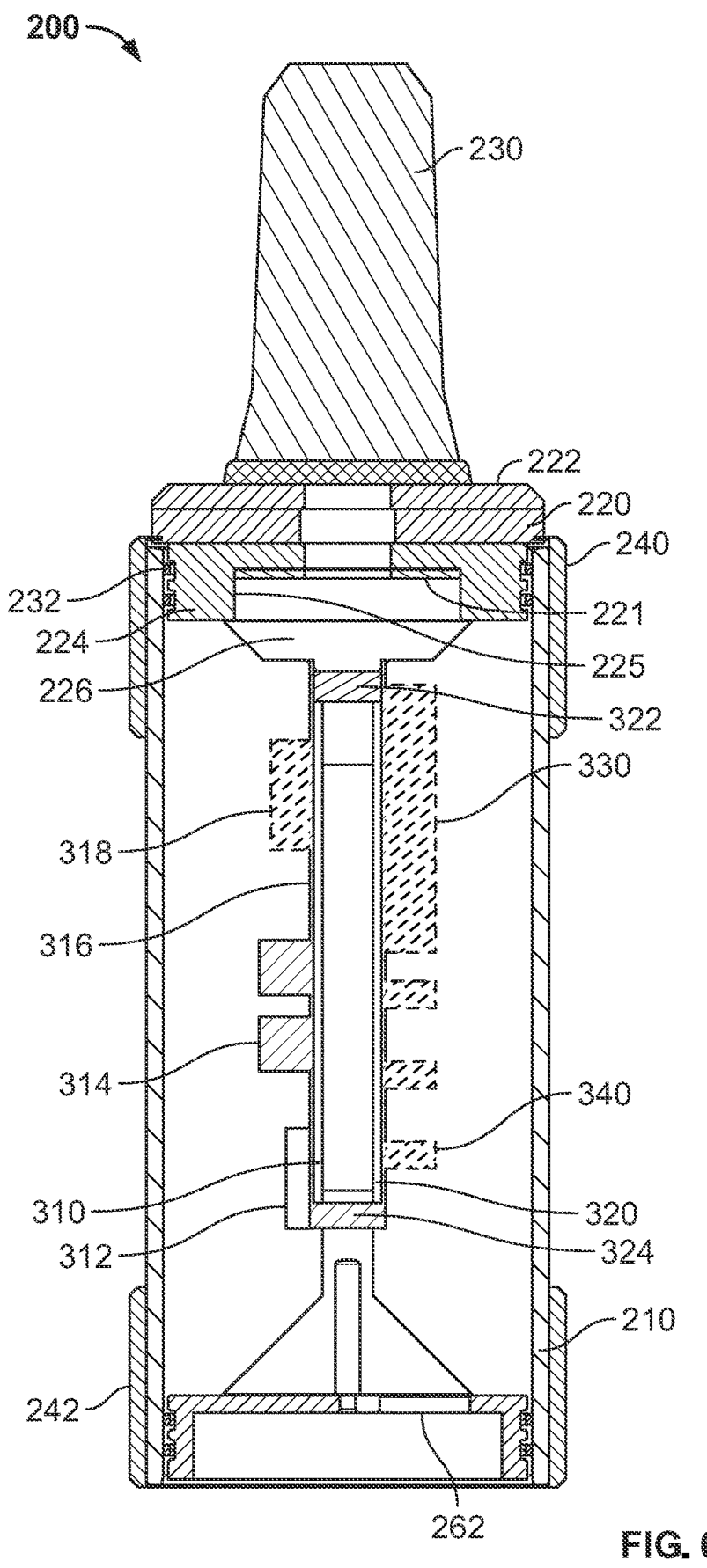
FIG. 6 is a cross sectional view of the node shown in FIG. 3 taken along line 6-6.

FIG. 6 shows a cross sectional view of the node shown in FIG. 3, taken along line 6-6.

Mechanical Structure

The node 200 shown in FIG. 6 includes base 262 as described above, a rigid internal skeleton or frame 226, upper cap 224, tubular enclosure 210, and sleeves 240, 242. The caps 224, 262 are shown including O-rings or sealing members 232 that are operable to form a liquid tight seal with the tubular enclosure 210 when the tubular enclosure is joined to the caps so as to prevent moisture from reaching the internal electrical components, discussed herein.

Electrical Components

The node 200 shown in FIG. 6 includes a main circuit board 310 which can support an integrated radio communication and CPU module 312. An example of an integrated radio communication module and CPU is the WL865E4-P Wi-Fi Module, manufactured by Telit Wireless Solutions (Durham, North Carolina). It is an integrated dual band, dual mode, combo Wi-Fi (802.11 a/b/g/n)/Bluetooth Low Energy (BLE) 5.0 module to add wireless connectivity to their products. The module is based on an integrated tri-core system-on-chip, with dedicated CPU's for IoT application, Wi-Fi and BLE. The IoT application processor runs on ARM Cortex-M4F @128 MHz with 300 KB of dedicated SRAM. Module also integrates 4 MB of internal flash with wide array of peripherals (SDIO, SPI, UART, ADC, PWM, GPIO, I2S, I2C, USB—for manufacturing only).

However, in other embodiments, the main board 310 can support separate components dedicated to Wi-Fi (e.g., optional radio/modem 318), Bluetooth, memory and processing that can execute instructions stored in the memory. Non-limiting examples of memory are solid-state drive (SSD), a flash program memory, a random-access memory (RAM), and/or any other volatile or non-volatile memory. Non-limiting examples of processors include digital electronic devices such as one or more field programmable gate arrays (FPGAs) that are programmed to perform the methods describes herein or may include one or more general purpose hardware processors (e.g., CPU) programmed to perform the methods described herein pursuant to program instructions in firmware, memory, other storage, or a combination. Such processors may also combine custom hard-wired logic, ASICs, or FPGAs with custom programming to accomplish the techniques. An example of a suitable processing device is model PIC24FJ1024GB610, manufactured by Microchip Technology Inc. (Chandler, AZ).

The node 200 preferably includes at least one antenna 230 that enables wireless communications with other devices. Preferably, the node has an external antenna 230 extending from the top of the enclosure that enables cellular, mesh, or other wireless communication. Additionally, or alternatively, node can include at least one antenna enabling node to operate as a radio node that communicates with other connected nodes or connected mobile devices such as a user's phone or tablet and or computer. If node includes multiple antennas, a particular antenna can be designated as providing a primary mode of communication, and a different antenna can be designated as providing a secondary mode of communication. For example, a cellular communications antenna can provide a primary mode of communication, and a mesh networking radio antenna can be used as backup. Node can also include at least one modem, such as a cellular modem.

The node 200 shown in FIG. 6 also includes a touch sensor 316 to allow a user to directly communicate with the node. The sensor is comprised of a physical pad and or pin on the printed circuit board, which can be connected to any part of the enclosure. The touch sensor, can be used to detect the intervention of a user, to either confirm a notification or to change the state of any connected device or equipment and or machine such as a pump. As a user may not have any mobile device or way of interacting with a node, the touch sensor provides a method to allow a user to interact with nodes and is typically done by touching the device such as with a user's hand. An example usage of the touch sensor is to acknowledge a frost alert or failed pump and to thereby stop the pump and change the pattern of the status light, for example from flashing red to solid red illumination.

The main board 310 is also shown supporting a plurality of sensor connectors. As described herein, a wide variety of sensors may be connected to the node 200 for monitoring.

Power Supply

In embodiments, external power is supplied to the node 200 via a port in the base cap 262. The port may be configured variously to receive a power cable or connector or may be configured as a USB port and connected to the main PCB 310.

The node 200 shown in FIG. 6 also includes a second or expansion PCB 320. The expansion PCB is connected to the main PCB via interconnects 322, 324, all of which are affixed to frame 226.

The expansion PCB 320 serves to allow some degree of customization to the node and/or to add additional optional electrical components. For example, if desired, the expansion PCB can support additional sensors and control connectors 340.

The expansion PCB can also support a rechargeable battery and charge controller 330. Examples of batteries include NCR18650, manufactured by Panasonic (Osaka, Japan). Additionally, in embodiments, node 200 and battery can be powered and charged, respectively, by an external solar energy source.

Optionally, in embodiments, a display (not shown) may be incorporated into, or externally attached to the node (e.g., on one of the PCBs 310, 320), and the whole enclosure 210 can be made of a transparent material, and include a transparent window for the display.

FIG. 6 also shows status illumination indicator 220 sandwiched between antenna support plate 222, and upper cap 224. A dedicated status indicator PCB 221 for controlling the status illumination indicator is arranged in a recess 225 in the upper cap.

Figure 7:
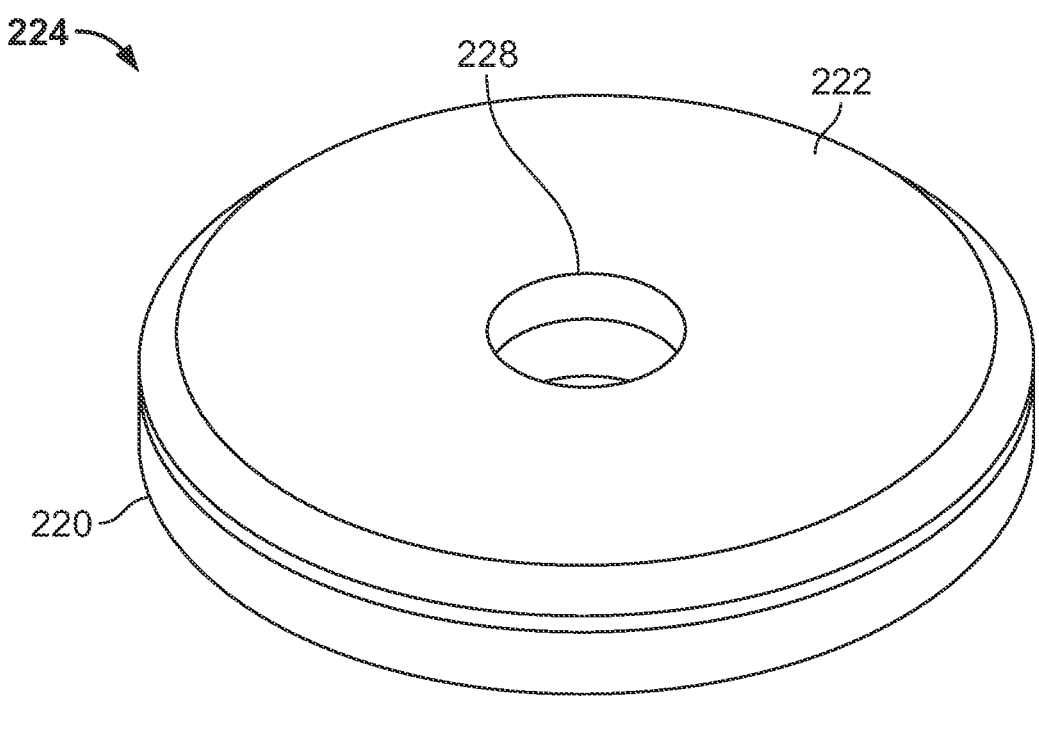
FIGS. 7-8 are top and bottom perspective views, respectively, of a status indicator assembly in accordance with an embodiment of the invention.
Figure 8:
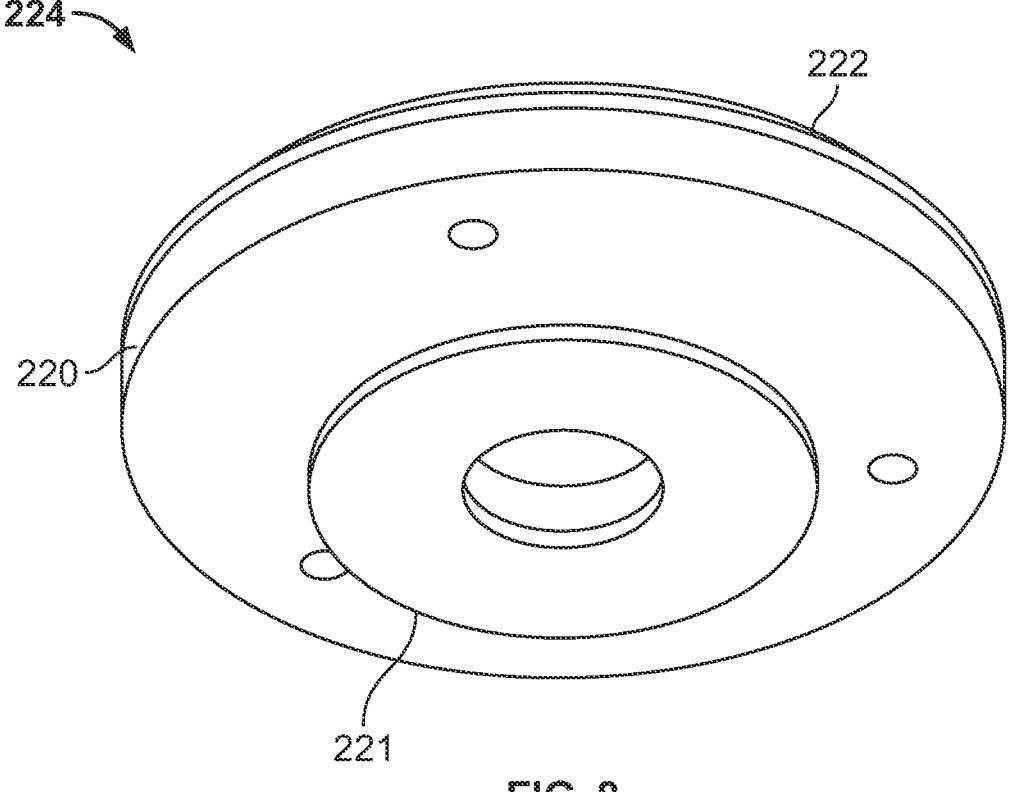

With reference to FIGS. 7-8, an enlarged top perspective view and bottom perspective view of a status indicator assembly 224 is shown in accordance with an embodiment of the invention. The status indicator assembly is shown comprising a disk-shaped illuminator or light 220, status indicator circuit 221, and antenna platform or plate 222. Each of the plate, circuit, and light are shown with an aperture to accommodate wiring for the antenna (not shown). However, for embodiments in which the antenna is not mounted on the top of the node, the status indicator assembly need not have a through hole.

The illuminator or light 220, as discussed herein, is operable to transmit light in the visible wavelength range, and in a wide range of predetermined patterns, intensities, and colors. An example of a suitable light with dedicated circuit is model WS2812, manufactured by Worldsemi (GuangDong, China). In embodiments, the light 220 is a stand-alone addressable LED, with programmable color, and intensity. Together with many of these LEDs an array of LEDs can be attached together to the same bus and power source, and be independently controlled.

The plate, when present, may comprise a rigid material to support the antenna. Exemplary materials for the plate are aluminum and plastic.

Status Indicator

Figure 9:
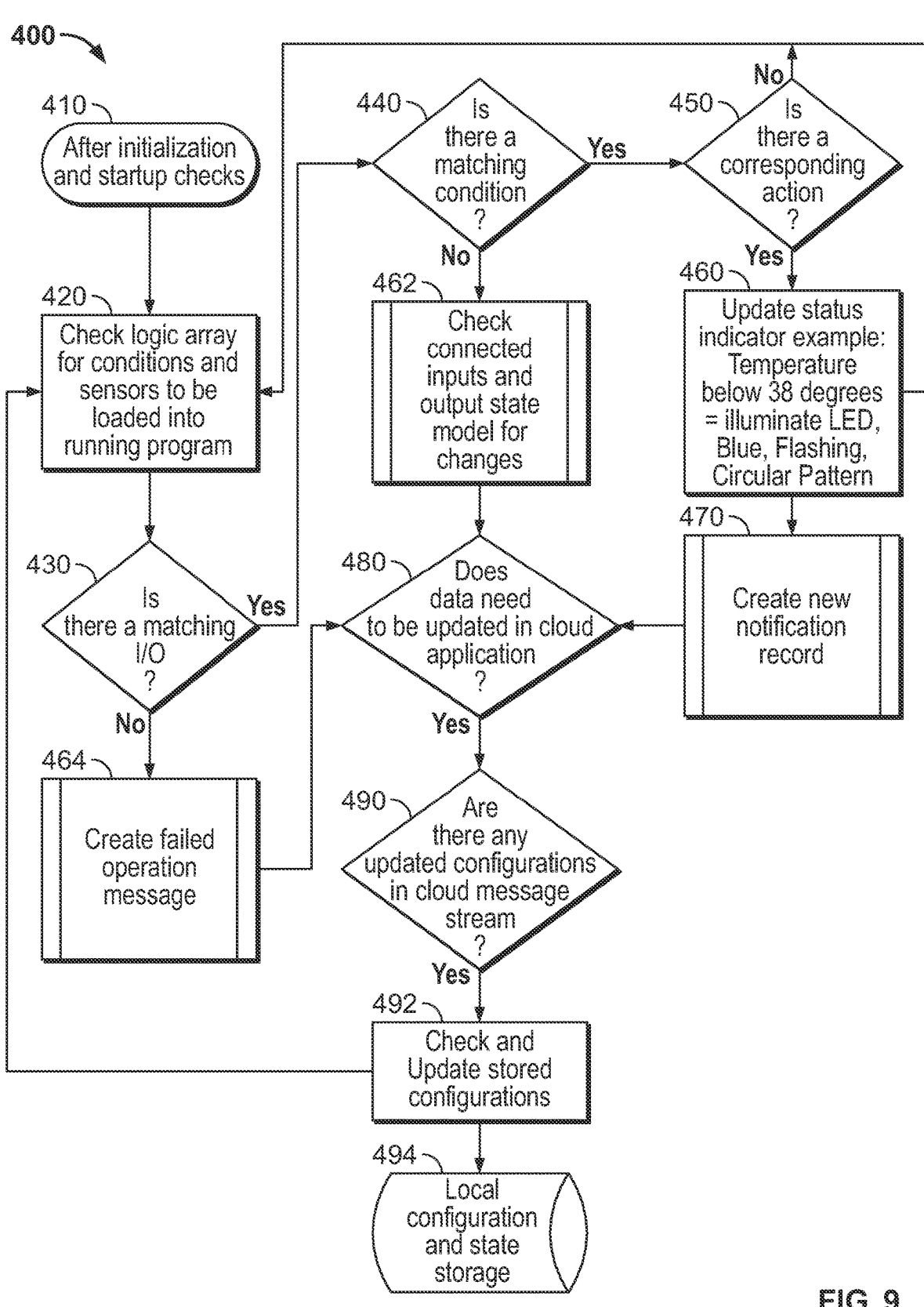
FIG. 9 is a flow diagram of a method in accordance with embodiments of the invention.

FIG. 9 is a flowchart of a method 400 indicating the status of a device (e.g., sensor or controller) being monitored by an automated monitoring node in accordance with an embodiment of the invention.

Step 410 states to perform initialization and startup checks. This step identifies if whether there are any stored errors on the node, and can create a corresponding notification record of same.

Step 420 states to check for conditions and sensors. Particularly, and with reference to step 430, the method checks for matching input/outputs. For example, is an anticipated temperature, humidity or soil moisture sensor input present. If not, the method proceeds to step 464 and generates a failed operation message. In embodiments, a failed operation message can be implemented, and when a failed sensor is detected, the notification is shown by the status light indicator flashing on and then off, specifically for example from high-intensity of approximately 7 lumens to 0 lumens, or off.

If the input/output matches, the method proceeds to step 440. Step 440 states to query for a matching condition. For example, is the temperature detecting a temperature below 38 degrees Fahrenheit. If not, the method proceeds to step 462, and the node checks for state model changes to the inputs and outputs (e.g., the temperature sensor is detecting a temperature out of realistic range, is uncalibrated properly, is detecting intermittently/inconsistently, or its reading is more or less than 5 degrees than the previous readings).

If a condition matches, the method proceeds to step 450 to determine whether there is a corresponding action. For example, and with reference to step 460, if the temperature reading is below 38 degrees Fahrenheit, the status indicator is luminated to show a blue flashing light in a circular pattern.

Step 470 creates a new notification record of the status indicator action.

Step 480 queries whether the data should be updated to the cloud application, described herein. For example, if the temperature has changed more than a threshold amount, then the data is sent to the cloud.

Step 490 states to query whether there are any updated configurations in the cloud stream. For example, an operator may determine to program the status indicator to illuminate with green light instead of blue when the temperature is below 38 degrees F. The new configuration is updated in step 492.

Step 494 states to update local state storage with the updated configuration.

Without intending to being bound to theory, one meaningful advantage of the methods and systems described herein is to allow operators of equipment see the status of nodes from a relatively long distance (d) from the node. For example, with reference to FIG. 1, the tractor operator can see the status of a monitored device 130 as she is driving a tractor at distance (d) from the node 112. Distance (d) can be 0 to 300 ft, and typically from 5 to 50 ft.

The color, intensity, and pattern of the light indicator is programmed to indicate the status of the sensor(s) being monitored. Embodiments described herein reduce or eliminate the need to be within an arm's distance to read or understand a display describing the status of the device being monitored.

Figure 10:
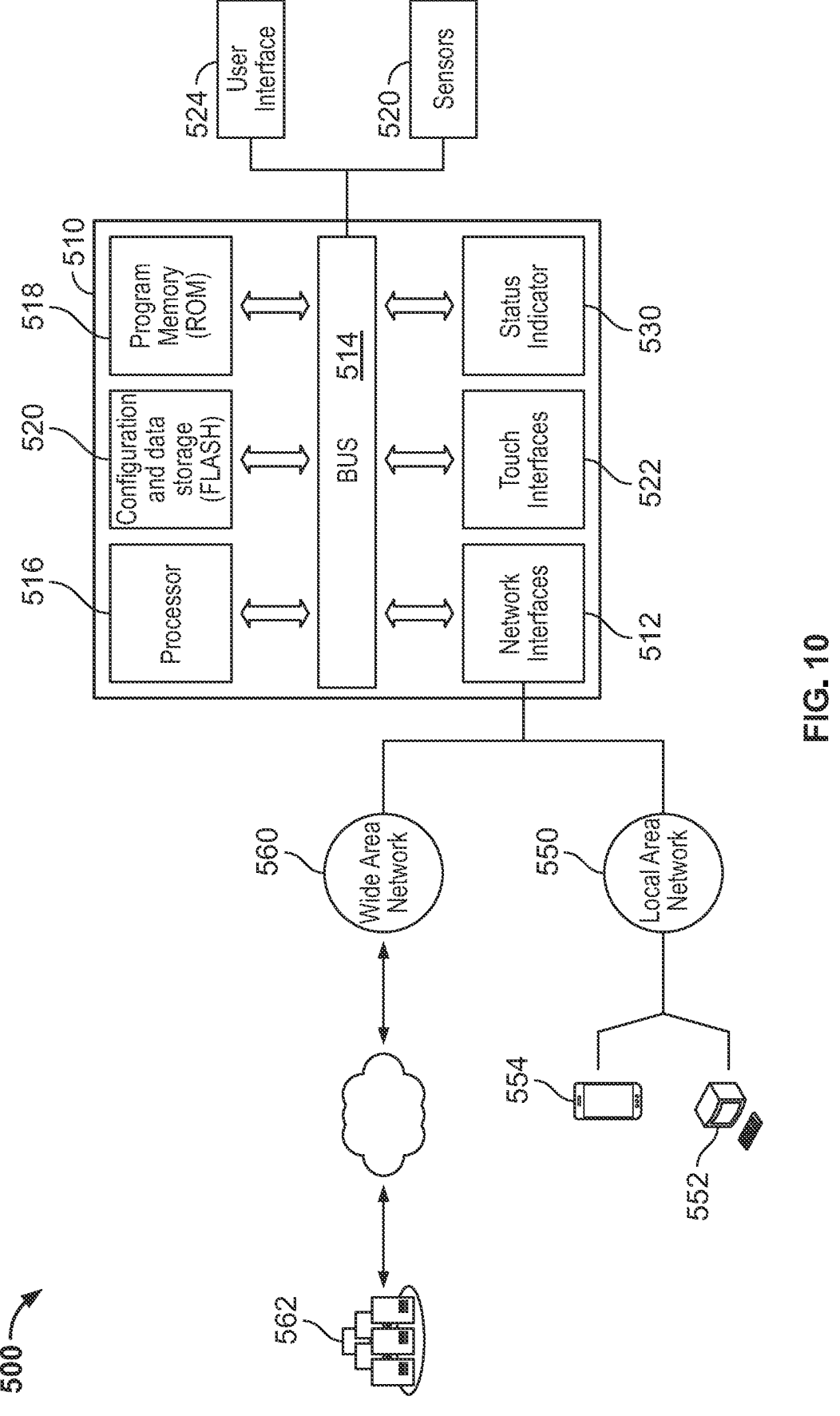
FIG. 10 depicts a block diagram of a node in accordance with an embodiment of the invention.

FIG. 10 depicts a block diagram of a status indicator node system 500 in accordance with an embodiment of the invention.

The system 500 is shown having a status indicating node 510 coupled to sensors 520. Examples of sensors include, without limitation, temperature sensors, humidity sensors, light sensors, etc. Optionally, the node 510 may be coupled to controller such as a controller of a water valve for a water irrigation source. The number and types of sensors and controllers being monitored by the node may vary widely. Preferably, the devices being monitored are coupled to the node via Bluetooth however the invention is not so limited except where recited in any appended claims.

System 500 shown in FIG. 10 also includes a local area network (LAN) 550 and a wide area network (WAN) 560. The LAN and WAN can be connected to the node 510 via network interface 512. As described herein, examples network interfaces include, without limitation, Wi-fi receivers, ethernet or WAN ports, cellular, satellite, or radio modems, etc.

The local area network 550 is shown having a computer 552 and smart phone 554. The phone and computer can be used to communicate with the node 510, and cloud servers 562. Examples of types of communication include receiving data, providing instructions, turning on and off any attached equipment such as pumps, and programming the node. In embodiments, a smart phone or tablet is operable (e.g., via a downloaded App) to communicate and operate the node 510. Likewise, the computer 552 can access a website or portal to communicate with the node 510.

Wide area network 560 is shown sending and receiving data to a set of remote servers 562. In this manner, in embodiments, data, configurations, records, can be uploaded to the cloud servers for safe and back up storage 562. Particularly, the remote or cloud server can be programmed with instructions to host a node application for visualizing data of the node, communicating with the node, instructing the node, and to update firmware and software on node.

Node 510 is shown comprising a bus 514 or other communication mechanism for communicating information, and a hardware processor 516 coupled with the bus for processing information. Hardware processor may be, for example, a processing device as described herein.

The embodiment of the invention shown in FIG. 10 also includes a configuration and data storage memory 520, such as a flash or random-access memory (RAM) or other dynamic storage device, coupled to the bus 514 for storing information and instructions to be executed by processor 516.

The embodiment of the invention shown in FIG. 10 also includes a read only memory (ROM) 518 or other static storage device coupled to bus for storing static information and instructions for the processing device.

Collectively, the processor and memory are operable to communicate and instruct the sensors, controller, and status indicator.

The node 510 shown in FIG. 10 also includes a touch interface 522. As such, the operator may communicate directly with the node. For example, the user may have received a notification from the application on their mobile phone, or having seen the notification of a failed connected device from the status light. Upon inspection of the node, and connected devices, the user may then touch the device enclosure, or the touch sensor, to disable any ongoing alerts. Or through any pre-programmed directives, could touch with a pattern such as three times, to turn on a connected equipment, such as a pump.

The embodiment of the invention shown in FIG. 10 also includes a user interface 524 outside the node. In embodiments, a portable handheld dedicated device can communicate with the node. Such a device may include alphanumeric and other keys and can be wireless coupled to the bus for communicating information and command selections to processor via Bluetooth, infrared, or perhaps near field techniques.

The user interface may also be implemented on a tablet or smart phone, or computer connected to the node via the LAN or WAN or otherwise, as described above.

Additionally, in embodiments, a user interface can be incorporated into the node itself. An example of an onboard user interface is a small touchscreen display (note shown).

Other modifications and variations can be made to the disclosed embodiments without departing from the subject invention.

I claim:

1. An automated monitoring node for indicating status of one or more sensors in an agricultural setting, the node comprising:
   an enclosure comprising a rigid tubular-shaped body and an endcap, wherein the body and endcap form a liquid tight seal;
   a main circuit board housed within the enclosure;
   a radio communication and central processing unit module supported by the main circuit board and operable with an antenna to provide Bluetooth and WIFI connectivity; and
   a programmable status indicator arranged on an exterior of the enclosure, the status indicator comprising at least one light source operable to emit a plurality of different user-chosen light patterns, motion, intensities and color; and wherein the radio communication and central processing unit module is operable to:
      receive, from a remote server, instructions for monitoring the sensors, wherein the instructions include user-chosen status indicator actions and a mapping of sensor inputs and outputs, and conditions to corresponding user-chosen status indicator actions;
      store the instructions in logic arrays in a local storage on the node,
      check the local storage for updates to instructions and update the logic arrays according to the instructions if an update was received by the node; and
      check the logic arrays for a matching sensor input and output, and instruct the status indicator to perform a status indicator action according to the logic arrays if a failed sensor is detected, and if there is a matching input and output, then
      check the logic arrays for a matching condition based on data received by the sensor, and instruct the status indicator to perform a status indicator action according to the logic arrays if a sensor condition is matched by data received from the sensor; and
      wherein the status indicator action comprises a user-chosen light pattern, motion, intensity, and color for each condition for each sensor.

2. The node as recited in claim 1, wherein the radio communication and central processing unit module is multi-functional and operable to communicate using different types of wireless platforms selected from the group comprising Wi-Fi, Bluetooth, Cellular, Satellite, and RF.

3. The node as recited in claim 1, wherein the sensor data is communicated via the radio communication and central processing unit module to a cloud based application server, an on-premise server, or to any node connected to the same network.

4. The node as recited in claim 1, wherein the node is operable to be programmatically controlled, in-field using a configuration interface through mobile phone, or computer, or remotely using a cloud connected application.

5. The node as recited in claim 1, wherein, when the node is powered up, the local storage is checked for updates.

6. The node as recited in claim 1, comprising a first logic array containing the instructions, whereby if data received by a sensor is below a threshold value, the status indicator shall flash in a circular pattern rotating about the body of the node.

7. The node as recited in claim 1, further comprising a cloud connection to remotely monitor and control the node.

8. The node as recited in claim 1, wherein the node is adapted to be operable as a stand-alone device and independent of a cloud connection, WAN, LAN, or mesh network.

9. The node as recited in claim 1, wherein the node is adapted and operable to allow a user to re-program the operation of the status indicator by a directly connected computer using a programming port, remote wireless interface, or a cloud connected application from a mobile device or desktop application.

10. The node as recited in claim 1, wherein the node is operable to provide feedback for a combination of sensors and their corresponding values.

11. The node as recited in claim 10, wherein the feedback is based on sensing irrigation flow and pump status.

12. The node as recited in claim 1, wherein the instructions comprise instructions for temperature and humidity sensors to visually alert a user of impending dangers which could damage a crop.

13. The node as recited in claim 12, wherein the node provides the visual alert immediately in the field.

* * * * *